(12) United States Patent
Wu et al.

(10) Patent No.: US 9,870,599 B2
(45) Date of Patent: Jan. 16, 2018

(54) ANALYSIS SYSTEM AND METHOD FOR REDUCING THE CONTROL FLOW DIVERGENCE IN THE GRAPHICS PROCESSING UNITS (GPUS)

(71) Applicants: National Taiwan University, Taipei (TW); MEDIATEK INC., Hsinchu (TW)

(72) Inventors: Che-Yang Wu, Taipei (TW); Wei-Chung Hsu, Taipei (TW)

(73) Assignees: NATIONAL TAIWAN UNIVERSITY, Taipei (TW); MEDIATEK INC., Hsinchu (TW)

( * ) Notice: Subject to any disclaimer, the term of this patent is extended or adjusted under 35 U.S.C. 154(b) by 0 days.

(21) Appl. No.: 15/263,417

(22) Filed: Sep. 13, 2016

(65) Prior Publication Data
US 2017/0330303 A1    Nov. 16, 2017

(30) Foreign Application Priority Data
May 13, 2016   (TW) .............................. 105114887 A

(51) Int. Cl.
*G06T 1/20*    (2006.01)
*G06F 9/30*    (2006.01)
*G06F 9/38*    (2006.01)

(52) U.S. Cl.
CPC ............ *G06T 1/20* (2013.01); *G06F 9/30058* (2013.01); *G06F 9/3867* (2013.01)

(58) Field of Classification Search
CPC ...... G06T 1/20; G06F 9/30058; G06F 9/3867
See application file for complete search history.

(56) References Cited

U.S. PATENT DOCUMENTS

| | | | |
|---|---|---|---|
| 9,606,797 B2* | 3/2017 | Vaidya | G06F 9/30018 |
| 2013/0290674 A1* | 10/2013 | George | G06F 8/314 |
| | | | 712/201 |
| 2016/0019066 A1* | 1/2016 | Diamos | G06F 9/30145 |
| | | | 712/228 |
| 2016/0179535 A1* | 6/2016 | Chen | G06F 9/30058 |
| | | | 712/22 |
| 2016/0239302 A1* | 8/2016 | Puthoor | G06F 9/30058 |
| 2017/0061569 A1* | 3/2017 | Sathe | G06T 1/60 |
| 2017/0123797 A1* | 5/2017 | Friedmann | G06F 9/30058 |

* cited by examiner

*Primary Examiner* — Jacinta M Crawford
(74) *Attorney, Agent, or Firm* — Bacon & Thomas, PLLC

(57) ABSTRACT

The invention discloses an analysis system and method for reducing control flow divergence in the Graphics Processing Units (GPUs). A computing unit is used to count the number of branch, number of cycle, and to calculate at least one direction ratio. A profiler is used to determine whether the code having the optimized control flow structure and the specialized branch or not. The optimization decision unit can determine which transform pattern can be used to transform the sub-control flow structure.

14 Claims, 4 Drawing Sheets

|  | Thread1 | Thread2 | Thread3 | Thread4 | Sum |
|---|---|---|---|---|---|
| Block A | 1 | 0 | 0 | 1 | 2 |
| Block B | 2 | 3 | 2 | 3 | 10 |
| Ratio | 0.5 | 0 | 0 | 0.33 | 0.2 |

ANALYSIS SYSTEM AND METHOD FOR REDUCING THE CONTROL FLOW DIVERGENCE IN THE GRAPHICS PROCESSING UNITS (GPUS)

BACKGROUND

1. Field of the Invention

The present invention relates to an analysis system and method for reducing control flow divergence, particularly to an analysis system and method suitable to be used in the Graphics Processing Units (GPUs).

2. Description of the Prior Art

Because the computing amount of computer is larger and larger than before, thus, the Graphics Processing Units (GPUs) are used to deal with the data computation associated with the graphs conventionally. The current GPU can also be used to deal with the data computation of general type, particularly the single instruction multiple data (SIMD), which is used to execute the parallel threads of same instruction.

Once there is the central processing unit (CPU), there will be a great change on the original pure computation execution mode by the central processing unit (CPU) operation. Particularly some pure large amount computation could be transferred to the GPU from the CPU and executed calculation, in order to reveal the advantage of GPU and increase the performance of computation.

As for iterating the same computation in the whole large matrix, if it is executed in the CPU, the loops need to be used to calculate every element in the whole matrix gradually. If it is computed by the GPU, multiple elements in the whole matrix can be calculated in parallel simultaneously, and the calculation speed can be increased greatly.

The treatment kernel of the GPU is a highly parallel multiple processor which can execute many execution threads of many computer programs concurrently. The execution threads of the GPU are grouped as a warp. In the warp, the number of thread is called as the execution model width of Single Instruction and Multiple Data (SIMD). At any time, all the threads in the warp are designated as the same instruction, every thread in the warp are designated as the specific data values. If the GPU is executing some instructions which some threads execute the unwanted instructions, for example, the conditional instructions, those threads shall be waited or idle, and other threads will be executed continuously, this condition is called as the divergence. Because these plurality of idle threads are not used, the divergent branches will cause the whole computing flow amount to be reduced.

Please refer to FIG. 1A and FIG. 1B. FIG. 1A illustrates an example for the divergent flow control structure and the execution thread scheduling diagram. FIG. 1B illustrates an example for adopting a conventional method for reducing the flow control divergence and the execution thread scheduling diagram.

In FIG. 1A, the schedule for resolving the divergence is not adopted, assume there are three execution threads in this execution warp, it is able to see a program code, which includes an IF statement with a conditional branch. In FIG. 1A, the execution threads are grouped within the Block B only. Thus, in some conditions, the execution threads will be idle to form the divergent situation and reduce the computation performance.

However, in FIG. 1B, a conventional method for resolving the schedule of divergence is adopted. Before executing the Block A, the threads are grouped firstly and executed together, so that the divergence can be reduced. However, if the conventional scheduling method is carried out, and when the execution time of the Block B is much larger than the execution time of the Block A, the computing time of the loop will be increased.

Thus, it is necessary to improve the analysis system and method for reducing the flow control divergence, in order to solve the shortcoming in the conventional technology about when the runtime of the Block B is much larger than the runtime of the Block A, the computing performance will be slowed down. It is also an urgent topic which has to be improved in the technical field of relevant sectors.

SUMMARY

The main purpose of present invention is to provide an analysis system for reducing the flow control divergence, which is applied for in the Graphics Processing Unit (GPU). The GPU comprises a computing unit and a hardware performance profiling support unit. The computing unit is used to count the number of at least one branch, the number of at least one cycle, and to calculate at least one direction ratio of code, and to send the information to a hardware performance profiling support unit. Wherein, the analysis system for reducing the flow control divergence as the analysis system comprises a compiling unit, a profiler unit, and an optimization unit. The compiling unit is used to load the program code. The profiler unit is connected to the compiling unit. The profiler unit is used to receive the number of branch, the number of cycle, and the direction ratio transmitted received by the hardware performance profiling support unit. The profiler unit is used to determine whether the program code having the sub-flow control structure, wherein, the sub-flow control structure is able to be optimized, and to be the specific branch instruction in accordance with the number of branch, number of cycle, and direction ratio. The optimization unit is connected to the profiler unit. The abovementioned direction ratio is the ratio of the number of the execution branch versus the number of the un-execution branch.

Wherein, when the profiler unit determines whether the program code having the sub-flow control structure and the specific branch instruction or not, the profiler unit calculates the branch ratio of each branch and the number of the specific branch instruction of each branch. Then, the optimization unit determines to use a transform pattern to transform the sub-flow control structure in accordance with the branch ratio and the number of the specific branch instruction.

In an embodiment of prevent invention, the profiler unit of the abovementioned analysis system further comprises a control flow profiler unit. The control flow profiler unit is connected to a compiling unit. The control flow profiler unit is used to determine whether the program code having the sub-flow control structure, and the specific branch instruction or not.

In an embodiment of prevent invention, the profiler unit of abovementioned analysis system further comprises an execution performance profiling unit. The execution performance profiling unit is connected to a compiling unit. The execution performance profiling unit is used to determine the execution performance efficiency of program code in accordance with the number of branch, the number of cycle, and the direction ratio.

In an embodiment of prevent invention, the profiler unit of abovementioned analysis system further comprises a branch data profiler unit. The branch data profiler unit is used to calculate the branch ratio, and the number of the specific branch instruction for each branch.

In an embodiment of prevent invention, the optimization unit of abovementioned analysis system further comprises an optimization decision unit. The optimization decision unit can determine which transform pattern can be used to transform the sub-control flow structure in accordance with the branch ratio and the number of specific branch instruction.

In an embodiment of prevent invention, the optimization unit of abovementioned analysis system further comprises a transform pattern unit. The transform pattern unit transforms the sub-flow control structure in accordance with the transform pattern determined by the optimization decision unit.

In another embodiment of prevent invention, an analysis method for reducing the flow control divergence in GPU is provided, comprising: loading and executing a counting program code on the GPU, counting the number of at least one branch of the counting program code of the GPU, the number of at least one cycle, and calculating at least one direction ratio of the counting program code; using the compiling unit to load the counting program code and produce the control flow diagram; using the profiler unit to determine whether the counting program code having a sub-flow control structure or not, wherein, the sub-flow control structure can be optimized. Upon determining the optimized sub-flow control structure, the profiler unit is used to determine whether the counting program code having a specific branch instruction or not. When the profiler unit is used to determine whether the counting program code having a specific branch instruction or not, the compiling unit is used to compile the counting program code to form a specific flow control structure. When the profiler unit is used to determine whether the counting program code having a specific branch instruction or not, the profiler is used to calculate the branch ratio, and the number of the specific branch instruction for each branch; according to the branch ratio and the number of specific branch instruction, the optimization unit determines the use of a conversion mode to convert the sub-flow control structure.

In an embodiment of prevent invention, as the abovementioned analysis method, the profiler further comprises an execution performance profiling unit. The execution performance profiling unit is connected to a compiling unit. The execution performance profiling unit determines the execution efficiency of counting program code in accordance with the number of branch, the number of cycle, and the direction ratio.

In an embodiment of prevent invention, as the abovementioned analysis method, the profiler further comprises a branch data profiler. The branch data profiler respectively calculates the branch ratio and the number of specific branch instruction for each branch.

In an embodiment of prevent invention, as the abovementioned analysis method, the optimization unit further comprises an optimization decision unit. The optimization decision unit can determine which transform pattern can be used to transform the sub-control flow structure in accordance with the branch ratio and the number of specific branch instruction.

In an embodiment of prevent invention, as the abovementioned analysis method, the optimization unit further comprises a transform pattern unit. The transform pattern unit determines the use of a conversion mode to convert sub-flow control structure in accordance with the conversion mode determined by the optimization decision unit.

In an embodiment of prevent invention, when the profiler unit determines there is no optimized sub-flow control structure, the process will be terminated.

In an embodiment of prevent invention, when the profiler unit determines the counting program code does not have the specific branch instruction, the compiling unit uses a common prediction method to compile the counting program code.

Summarized from the abovementioned description, through the analysis system and method for reducing the control flow divergence provided by the prevent invention, determine whether the counting program code has to be optimized or not by calculating the number of branch and the number of cycle, in order to improve the shortcoming of the abovementioned prior art.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The detailed features and advantages of prevent invention will be described in the following execution method in detail. The technical content of present invention will be understood and executed by the person skilled in the art. According to the content disclosed in this paper, the purpose and advantages of present invention can be understood easily by the person skilled in the art.

Figure 1A:
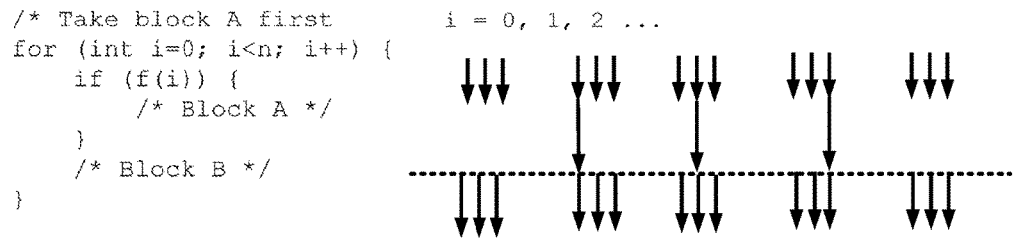
FIG. 1A illustrates an example for the divergent flow control structure and the execution thread scheduling diagram.
Figure 1B:
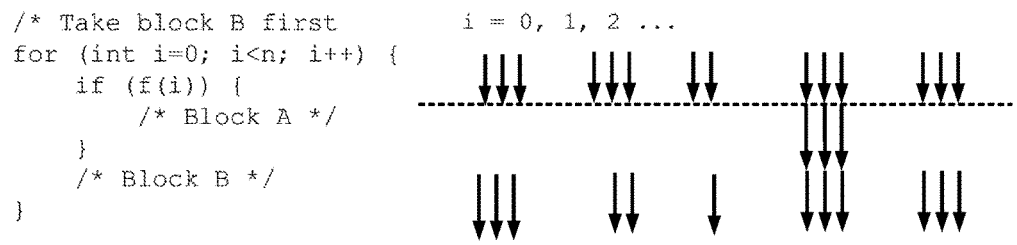
FIG. 1B illustrates an example for adopting the conventional method for reducing the flow control divergence and the thread scheduling diagram.
Figure 2:
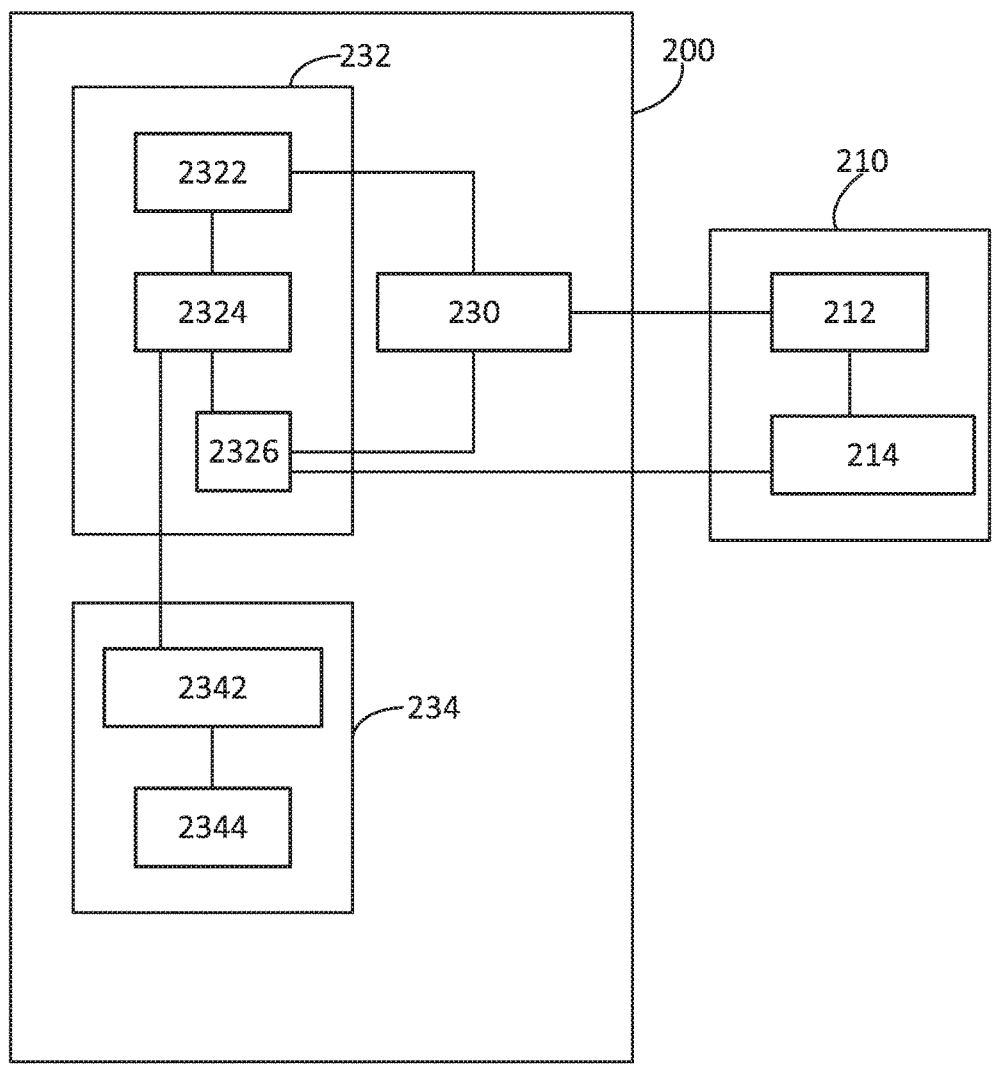
FIG. 2 illustrates the structure of analysis system provided by present invention for reducing the control flow divergence diagram.
Figures 3A, 3B:
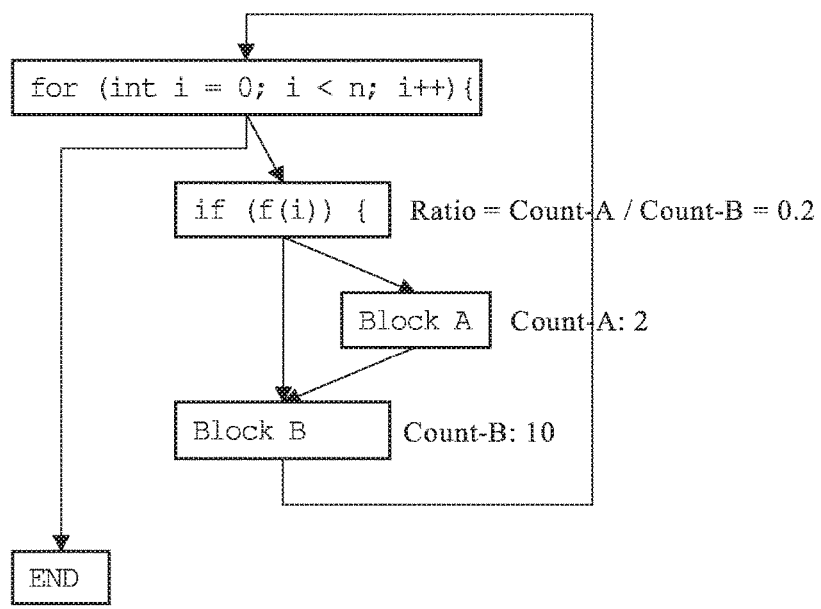
FIG. 3A illustrates the direction ratio of the program code provided by present invention.
FIG. 3B illustrates the table of the direction ratio calculated by the program code specified in FIG. 3A.

Please refer to FIG. 2 and FIG. 3A. FIG. 2 illustrates the structure of analysis system 200 provided by the present invention for reducing the control flow divergence. FIG. 3A illustrates the direction ratio of the program code provided by present invention.

As shown in FIG. 2, the analysis system 200 is suitable for the GPU 210. The GPU 210 comprises a computing unit 212 and a hardware performance profiling support unit 214. The computing unit 212 is used to count the number of at least one branch, the number of at least one cycle, and to calculate at least one direction ratio $R_d$ of counting program code. The computing unit 212 sends the produced number of branch, the number of cycle, and the direction ratio $R_d$ to the hardware performance profiling support unit 214.

Still as shown in FIG. 2, the analysis system 200 for reducing the control flow divergence comprises a compiling unit 230, a profiler unit 232, and an optimization unit 234. The compiling unit is used to load the counting program code sent from GPU 210. The profiler unit 232 is connected to the compiling unit 230. The profiler unit 232 comprises a control flow profiler unit 2322, an execution profiling unit 2324 and a branch data profiler unit 2326. The control flow profiler unit 2322 is connected to the compiling unit 230. The control flow profiler unit 2322 is used to determine whether the counting program code having the sub-flow control structure and the specific branch instruction or not.

As shown in FIG. 2, the execution performance profiling unit 2324 is connected to the compiling unit 230. The execution performance profiling unit 2324 receives the number of branch, the number of cycle, and the direction ratio sent from the hardware performance profiling support unit 214, and determines the execution performance efficiency of counting program code in accordance with the number of branch, the number of cycle and the direction ratio in the counting program code. The direction ratio $R_d$ is the ratio of the number of the execution branch and the number of the un-execution branch.

Please refer to FIG. 3A and FIG. 3B. FIG. 3B illustrates the table of the direction ratio calculated by the counting program code specified in FIG. 3A. When the system executes the counting program code, the computing unit 212 starts to conduct the computation, and the execution number of each execution thread is shown in FIG. 3B. The execution number of Block A is 2, the execution number of the Block B is 10, and the direction ratio $R_d$ is 0.2 estimated by the computing unit 212.

As shown in FIG. 2, the branch data profiler unit 2326 is used to determine whether the counting program code having the sub-flow control structure and the specific branch instruction or not, and to calculate the branch ratio $R_b$ and the number of the specific branch instruction for each branch.

As shown in FIG. 2, the optimization unit 234 comprises an optimization decision unit 2342 and a transform pattern unit 2344. The optimization decision unit 2342 can determine which transform pattern can be used to transform the sub-control flow structure in accordance with the branch ratio and the number of the specific branch instruction. The branch ratio $R_b$ is the ratio of branch in the counting program code. The transform pattern unit 2344 transforms the sub-flow control structure in accordance with the transform pattern determined by the optimization decision unit 2342.

Figure 4:
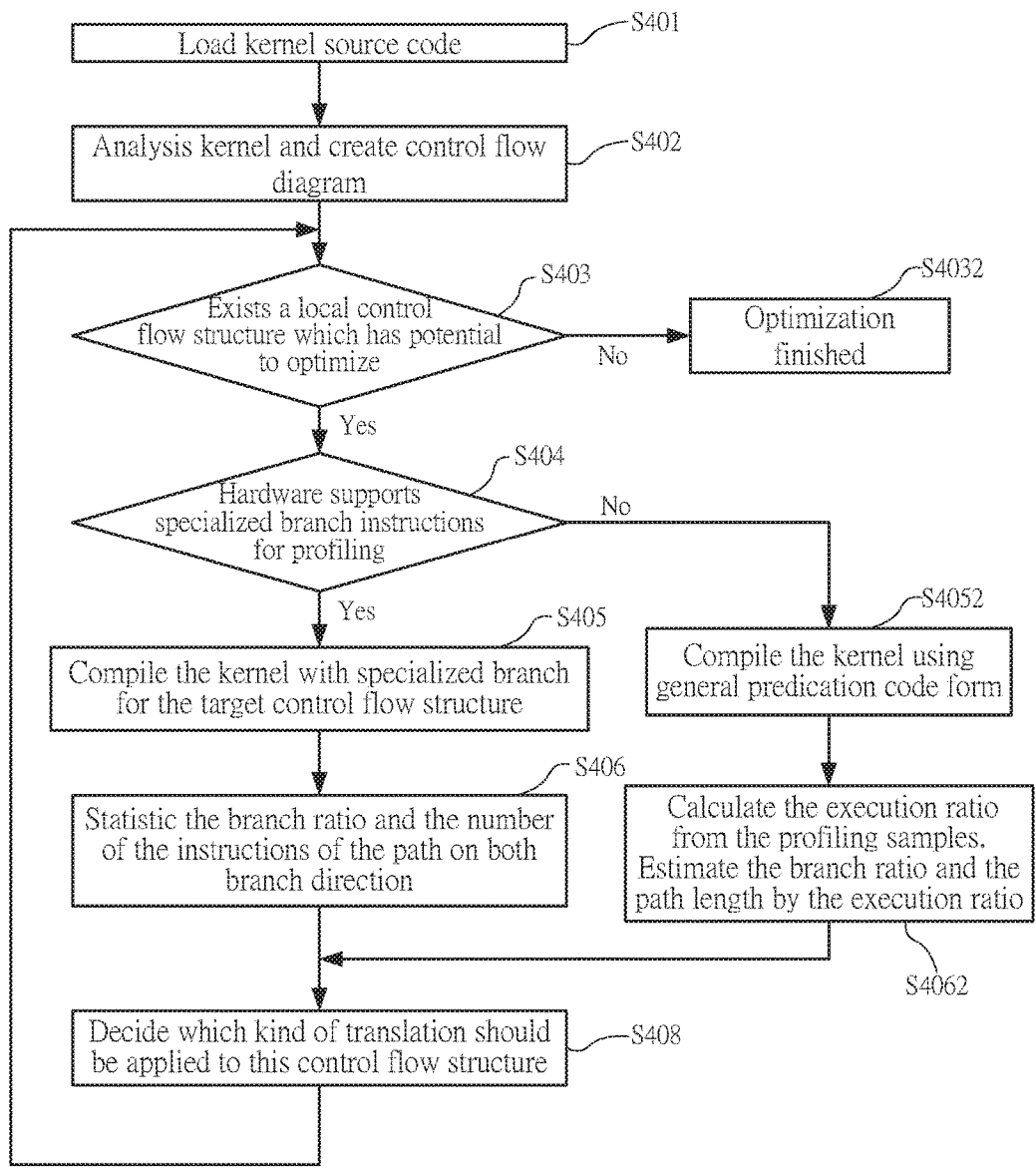
FIG. 4 illustrates the flow diagram of the analysis method provided by present invention for reducing the control flow divergence.

Please refer to FIG. 4. FIG. 4 illustrates the flow diagram of analysis method provided by present invention for reducing the control flow divergence. The analysis method provided by the present invention is suitable to be used in the GPU 210 specified in FIG. 2. As shown in FIG. 4, the steps comprise:

Step S401 of FIG. 4: Loading and executing a counting program code on the GPU 210 (as example shown in FIG. 3A), the GPU 2102 counts the number of branch, the number of cycle, and the direction ratio $R_d$ of counting program code.

Step S402 of FIG. 4: Using a compiling unit 230 to load the counting program code and produce the control flow diagram.

Step S403 of FIG. 4: Using a profiler unit 232 to determine whether the counting program code having a sub-flow control structure or not, wherein, the sub-flow control structure can be optimized.

Step S404 of FIG. 4: Upon determining the optimized sub-flow control structure, the profiler unit 232 is used to determine whether the counting program code having a specific branch instruction or not.

Step S405 of FIG. 4: When the profiler unit 232 is used to determine whether the counting program code having a specific branch instruction or not, the compiling unit 230 is used to compile the counting program code to form a specific flow control structure.

Step S406 of FIG. 4: When the profiler 232 is used to determine whether the counting program code having a specific branch instruction or not, the profiler unit 232 is used to calculate the branch ratio, and the number of the specific branch instruction for each branch.

Step S408 of FIG. 4: According to the branch ratio and the number of the specific branch instruction, the optimization unit 234 determines the use of a conversion mode to convert the sub-flow control structure.

In Step S403 of FIG. 4, when the profiler unit 232 determines there is no optimized sub-flow control structure, then, the process will be terminated, and go to Step S4032.

In Step S404 of FIG. 4, when the profiler unit 232 determines the counting program code does not have the specific branch instruction, the compiling unit 230 uses a common prediction method to compile the counting program code, and go to Step S4052. Then, in Step S4062: Calculating the execution rate from the analysis sample, and predicting the branch ratio $R_b$ of each path.

Summarized from the abovementioned embodiments, through the analysis system and method provided by present invention, it is able to determine the flow structure and branch which will slow down the GPU speed, and conduct the suitable transformation for the structure and the branch immediately in accordance with the hardware counting information and the software determining and transforming the process, in order to increase the processing speed.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An analysis system for reducing a flow control divergence in a graphics processing unit (GPU), said GPU comprises a computing unit, and a hardware performance profiling support unit, the computing unit is used to count a number of at least one branch and a number of at least one cycle, and to calculate at least a direction ratio of a counting program code, and to send an information to said hardware performance profiling support unit, said analysis system comprises:

a compiling unit, said compiling unit loads said counting program code;

a profiler unit, said profiler unit is connected to said compiling unit, wherein said profiler unit receiving a number of branch, a number of cycle, and a direction ratio transmitted by said hardware performance profiling support unit, said profiler unit determines whether said counting program code has an optimized sub-flow control structure and an optimized specific branch instruction in accordance with said number of branch, said number of cycle, and said direction ratio; and an optimization unit, said optimization unit being connected to said profiler unit, said optimization unit comprising an optimization decision unit, said optimization decision unit determines which transform pattern is used for transforming said sub-flow control structure in accordance with a branch ratio and said number of said specific branch instruction;

wherein, when said profiler unit determines whether said counting program code has said optimized sub-flow control structure and said specific branch instruction or not, said profiler unit calculates said branch ratio of said each branch and a number of a specific branch instruction.

2. The analysis system according to claim 1, wherein said profiler unit further comprises a control flow profiler unit, said control flow profiler unit is connected to a compiling unit, said control flow profiler unit determines whether a counting program code has said sub-flow control structure and said specific branch instruction or not.

3. The analysis system according to claim 1, wherein said profiler unit further comprises an execution profiling unit, said execution profiling unit is connected to a compiling unit, said execution profiling unit determines an execution efficiency of said counting program code in accordance with said number of branch, said number of cycle, and said direction ratio.

4. The analysis system according to claim 1, wherein said profiler unit further comprises a branch data profiler unit, said branch data profiler unit calculates said branch ratio and said number of said specific branch instruction for each branch.

5. The analysis system according to claim 1, wherein said direction ratio is a ratio of a number of execution branch and a number of un-execution branch.

6. The analysis system according to claim 1, wherein said optimization unit further comprises a transform pattern unit, said transform pattern unit transforms said sub-flow control structure in accordance with said transform pattern determined by said optimization unit.

7. An analysis method for reducing a flow control divergence in a graphics processing unit (GPU), comprising:

loading and executing a counting program code on said graphics processing unit (GPU), said GPU counting a number of at least one branch, a number of at least one cycle, and calculating at least one direction ratio of said counting program code;

using a compiling unit to load said counting program code and producing a control flow diagram;

using a profiler unit to determine whether said counting program code has a sub-flow control structure or not, wherein said sub-flow control structure is optimized;

determining said optimized sub-flow control structure, said profiler unit determines whether said counting program code has a specific branch instruction or not;

when said profiler unit determines whether said counting program code has a specific branch instruction or not, said compiling unit compiling said counting program code to form a specific flow control structure;

said profiler unit calculating a branch ratio, and said number of said specific branch instruction for each branch;

an optimization unit determining a conversion mode according to said branch ratio and said number of said specific branch instruction, and said optimization unit determining said conversion mode to convert said sub-flow control structure.

8. The analysis method according to claim 7, wherein said profiler further comprises a control flow profiler unit, said control flow profiler unit is connected to a compiling unit, said control flow profiler unit determines whether said counting program code has said sub-flow control structure, and said specific branch instruction or not.

9. The analysis method according to claim 7, wherein profiler unit further comprises an execution profiling unit, said execution profiling unit is connected to a compiling unit, said execution profiling unit determines an execution efficiency of said counting program code in accordance with said number of branch, said number of cycle, and said direction ratio.

10. The analysis method according to claim 7, wherein profiler unit further comprises a branch data profiler unit, said branch data profiler unit calculates said branch ratio and said number of said specific branch instruction for each branch.

11. The analysis method according to claim 7, wherein said optimization unit further comprises an optimization decision unit, said optimization decision unit determines which transform pattern to transform said sub-control flow structure in accordance with said branch ratio and said number of said specific branch instruction.

12. The analysis method according to claim 7, wherein said optimization unit further comprises a transform pattern unit, said transform pattern unit determines said conversion mode to convert said sub-flow control structure.

13. The analysis method according to claim 7, wherein when said profiler unit determines there is no optimized sub-flow control structure, then a process is terminated.

14. The analysis method according to claim 7, wherein said profiler unit determines said counting program code does not have said specific branch instruction, said compiling unit uses a common prediction method to compile said counting program code.

* * * * *